United States Patent [19]

Gojny et al.

[11] Patent Number: 5,053,285
[45] Date of Patent: Oct. 1, 1991

[54] METHOD AND APPARATUS FOR MAKING INSERTS FOR HONEYCOMB PANELS

[75] Inventors: Francis J. Gojny, Bonita; Guy S. Greene, Borrego Springs; Roswell L. Stahl, Jr., San Diego; Charles Z. Street, La Mesa, all of Calif.

[73] Assignee: Rohr Industries, Inc.

[21] Appl. No.: 275,909

[22] Filed: Nov. 25, 1988

[51] Int. Cl.⁵ .................. B32B 1/00; B32B 3/12
[52] U.S. Cl. ..................... 428/593; 428/603
[58] Field of Search .............. 428/593, 603, 116, 117, 428/118; 52/795, 796, 797, 799, 800, 806, 807

[56] References Cited

U.S. PATENT DOCUMENTS

| | | | |
|---|---|---|---|
| 2,435,341 | 2/1948 | Gundeman | 428/593 |
| 2,793,718 | 5/1957 | Pajak | 428/593 |
| 2,878,538 | 3/1959 | Theis | 428/593 |
| 3,072,225 | 1/1963 | Cremer et al. | 52/806 |
| 3,579,942 | 5/1971 | Cole | 52/806 |
| 3,662,805 | 5/1972 | Sygnator | 428/116 |
| 3,742,673 | 7/1973 | Jennings et al. | 52/806 |
| 3,872,564 | 3/1975 | Meyers et al. | 428/593 |
| 4,190,559 | 2/1980 | Retallick | 428/603 |
| 4,205,118 | 5/1980 | Schubert | 428/593 |
| 4,273,818 | 6/1981 | Buchs | 428/116 |
| 4,318,888 | 3/1982 | Chapman et al. | 428/116 |
| 4,598,063 | 7/1986 | Retallick | 428/593 |
| 4,716,067 | 12/1987 | Moji et al. | 428/117 |
| 4,717,612 | 1/1988 | Shackelford | 52/806 |
| 4,810,588 | 3/1989 | Bullock et al. | 428/603 |

*Primary Examiner*—John J. Zimmerman
*Attorney, Agent, or Firm*—Patrick J. Schlesinger; Frank D. Gilliam

[57] ABSTRACT

A method and apparatus for making an insert for selectively, locally, densifying panels having a honeycomb core and at least one face sheet. At least two narrow, long foil strips are fed from supply rollers through a corrugating device which corrugates at least one of the strips. Preferably, the depth of corrugations vary greatly between adjacent strips. From the corrugating device the strips go to a take up reel which winds the strips into a flat pancake coil. When the desired coil diameter is reached the coil is secured to prevent unwinding and the coil is removed from the reel. The coils are used to replace portions of the honeycomb core to locally improve density, strength and thermal transfer characteristics of the panel.

9 Claims, 2 Drawing Sheets

METHOD AND APPARATUS FOR MAKING INSERTS FOR HONEYCOMB PANELS

BACKGROUND OF THE INVENTION

This invention is directed to improving the performance of honeycomb core structural panels by localized densification of the panel.

Lightweight, high strength, panels made up of a honeycomb core and one or two face sheets bonded thereto have come into widespread use in aircraft, space vehicles and the like. While the panels have great strength across a broad panel, difficulties are encountered when it becomes necessary to fasten other structures to the panels. Typical standard bolts, rivets and similar fasteners cannot be directly used with the panels which are subject to crushing when highly localized stress is applied.

Also, while the thermal insulating properties of honeycomb panels are highly desirable in many applications, in some cases it is necessary to improve heat transfer in a local area from a heat source on one side of the panel to a heat sink or the like on the other side of the panel.

In the past, attempts have been made to improve the local strength and thermal transfer characteristics of honeycomb panels by cutting holes in the panel face sheet and injecting a synthetic resin potting compound to fill selected cells or groups of cells. A fastener or the like may be embedded in the potting compound, as described, for example, by Moji et al in U.S. Pat. No. 4,716,067. While effective for some purposes, this method is not adaptable to all fasteners, requires considerable hand-work and care to properly fill the cells and does not improve thermal conductivity, since most potting materials have low thermal conductivity.

In other cases, a region of the honeycomb core is removed, prior to application of the face sheets, and a solid metal insert is placed in the cutout. The insert is typically diffusion bonded or adhesively bonded to the face sheets when those sheets are bonded to the core. While these solid inserts are effective with a great many fasteners and have excellent thermal conductivity, they tend to be heavy and add an undesirably amount of weight, which can be of critical importance in aircraft and space vehicle applications. Also, the metal inserts must have a thickness precisely matching the honeycomb core thickness. Thinner inserts allow localized crushing of the panel before the insert is encountered, while thicker inserts will cause local bulges in the panel which are undesirably in aerodynamic surfaces. Thus, special, tight tolerance, inserts must be made for every honeycomb core thickness.

Therefore there is a continuing need for improved inserts for honeycomb core panels which can increase the density, strength and thermal conductivity in local areas without excessively increasing the weight of the assembly and can be easily made to precisely match the honeycomb core thickness.

SUMMARY OF THE INVENTION

In accordance with this invention there is provided a method and apparatus for making flat pancake coil inserts for use in honeycomb core panels to locally increase density, strength and thermal conductivity. Two or more long, thin foil strips are fed from supply reels to corrugating devices, preferably partially meshing adjustably spaced gear sets. The corrugating device is set so that the depth of corrugations in adjacent foils is considerably different. In fact, if desired, alternate strips could be uncorrugated although at least slight corrugating is preferred. From the corrugating device, the strips are guided to a take-up reel which winds the strips into a flat pancake reel. The size and tension of the coil is continuously monitored and when the desired size is reached the coil is clamped, the entering strips cut and the coil is removed from the apparatus. The ends of the strips on the coil are secured, such as by spot welding. While the coil as formed is flat, the coil can be deformed and bonded into an overall curved shape, which is desirable for use in curved honeycomb panels, such as engine nacelles.

The coil has high strength and high thermal conductivity but much lower weight than a solid insert of corresponding size because of the very great number of spaced openings throughout the coil. Typically, the weight of the coil is about 17% of the weight of a corresponding solid insert.

The coil is typically used by cutting out a corresponding region of a honeycomb core, placing the coil in the space, then bonding the face sheets to the core and coil by any suitable method, such as brazing or liquid interface diffusion bonding.

If desired, one of the contacting strip surfaces could carry a very thin (typically 0.0001 inch) layer of a brazing material such as copper, nickel or a combination thereof which could be plasma sprayed. Then, after the coil is formed it could be heated in an inert atmosphere to the melting temperature of the coating/foil material eutectic to bond the contacting strip surfaces within the coil together. A very strong, rigid and light weight insert results.

While any suitable foil may be used it is preferred to use the same strips as those from which the honeycomb core is fabricated. Then, the insert thickness will precisely match the core thickness.

BRIEF DESCRIPTION OF THE DRAWING

The advantages and features of this invention will become better appreciated and understood by reference to the following detailed description when taken together with the accompanying drawing, wherein.

DESCRIPTION OF PREFERRED EMBODIMENTS

Figure 1:
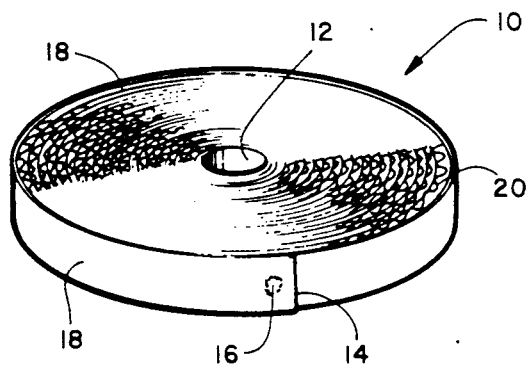
FIG. 1 is a perspective view of a flat pancake coil insert made in accordance with this invention.

Referring now to FIG. 1, there is seen a perspective view of the flat or pancake coil 10 of this invention. The thickness of coil 10 should be the same as the thickness of the honeycomb core with which it is to be used. Coil 10 has a small central hole 12 where the coil was wrapped around the axle of a reel, as detailed below.

The outside end 14 of the strip 18 making up the coil is secured by a small spot weld 16 in the embodiment shown. Any other suitable method for preventing the coil from unwinding during handling prior to insertion may be used as desired. For example, the end 14 could be adhesively bonded to the coil body, or the entire coil could be bonded at all inter-strip contact points by applying a penetrating adhesive, such as cyanoacrylate, to one surface of the coil. If desired, an overlapping ring of somewhat thicker uncorrugated material can be wrapped around coil 10 and secured such as by spot welding. This will add strength to the coil edge and reduce the risk of damage during handling.

Often, the honeycomb core is bonded to the face sheets by vacuum furnace brazing or liquid interface diffusion (LID) bonding through a thin layer of a copper nickel alloy on the contacting surfaces. When heated in an inert atmosphere to the melting temperature of the LID/structure eutectic, an excellent bond is achieved. In that circumstance, one of the surfaces of one strip could have a similar very thin layer of the brazing material such as a copper nickel alloy. Typically, the layer might be applied by electroplating and have a thickness of about 0.002 inch. This would cause the coil strips to be well bonded to each other and to the honeycomb panel during the panel brazing step. Liquid interface diffusion bonding is described in detail by James R. Woodward in U.S. Pat. No. 3,957,194, assigned to the assignee of this application.

The strips making up coil 10 can be formed from any suitable material. Typically, a titanium aluminide (T,-3A1-25V) may be used. Generally it is preferred that the coil be formed from the same strips from which the honeycomb core is formed, to absolutely assure matching thickness and electrical compatibility. If a different metal is used, care must be exercised to avoid galvanic action, such as by using an insulating adhesive between the coil and the honeycomb core and faces. While the strips may have any suitable thickness, generally thicknesses in the 0.001 to 0.008 inch range are preferred.

Figure 2:
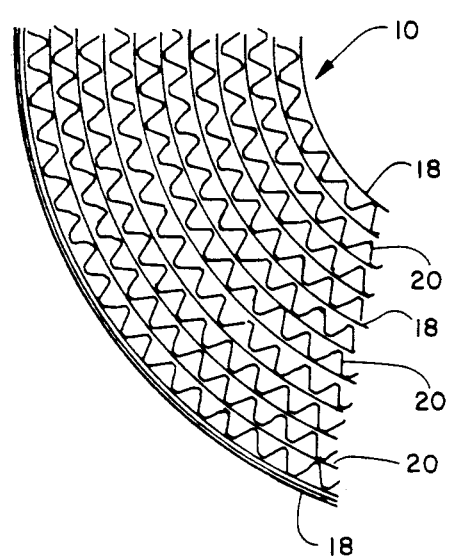
FIG. 2 is a detail plan view of a portion of the coil of FIG. 1.

As shown in detail plan view of FIG. 2, the corrugations in the strips are sine wave like curves. The period of the wave in alternate strips should differ sufficiently to prevent one strip from matching the next and "nesting" into it. Preferably the period of the corrugations in the first set of alternate strips 18 should have a period on wavelength at least 3 times that of the adjacent strips 20.

Typically, a coil may have one foil formed from 0.004 inch Ti-3A1-2.5V to a corrugation wave height of about 0.04 inch and a wave length of about 0.12 inch. The second foil would either be uncorrugated or have a much shorter wavelength, such as about 0.03 inch and wave height of about 0.01 inch.

The corrugations may have any suitable depth. Typically strips may have a width of about 0.250 to 2.0 inch. If desired, alternate flat strips could be used between corrugated strips, although we have found that corrugating both strips is preferable for highest strength with lowest weight.

While the sine wave-like corrugations shown are preferred for convenience and ease of manufacture, other configurations could be used if desired. For example, flat strips with periodic curves to one side or strips having more angular, sharper projections could be used.

If desired, a flat strip (possibly having greater thickness than the corrugated strips) could be secured as a ring around the outer edge of the insert 10 to reinforce that edge and aid in handling.

Figure 3:
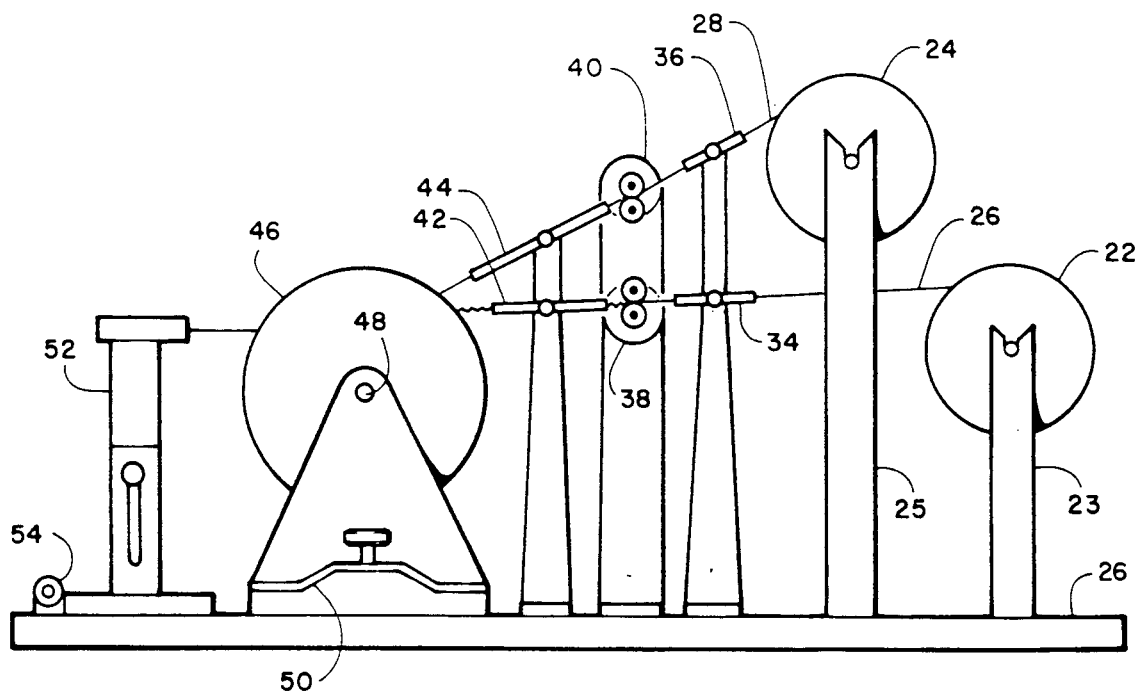
FIG. 3 is a schematic elevation view illustrating the apparatus of this invention.

The method and apparatus of manufacturing coils 10 will be further understood upon reference to the schematic representation of FIG. 3.

Two foil supply rolls 22 and 24 are mounted for rotation on support columns 23 and 25, respectively, on bed 27. Foil strips 26 and 28 are fed off rolls 22 and 24 to corrugating assemblies 30 and 32 through foil guides 34 and 36.

Each corrugating assembly 30 and 32 includes a pair of meshing gears 38 and 40, respectively and a conventional means (not shown) such as lead screw for moving the gears in each pair toward and away from each other. The teeth of one gear set are wider than the other, to provide the difference in sine wave period as discussed above. Depth of the corrugations is adjusted by moving the gears more into or out of mesh. If desired one "gear" of the gear set may be a pair of contacting smooth rollers where one uncorrugated foil is desired.

Figure 5:
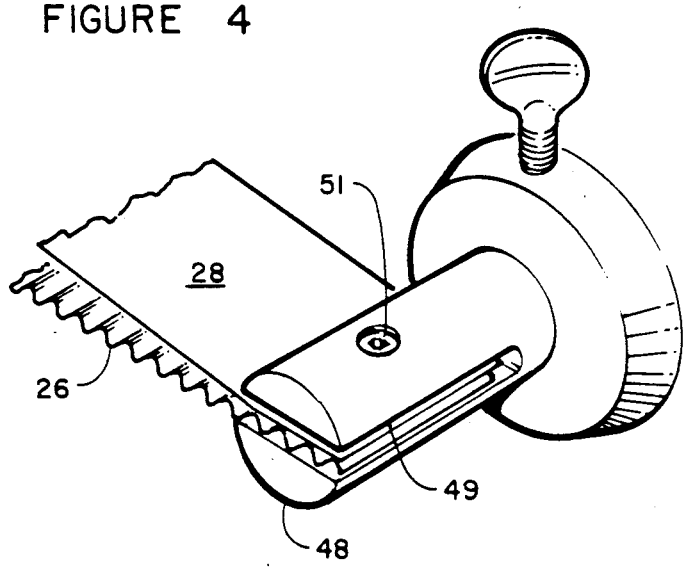
FIG. 5 is a detail sectional view through the winding axle.

The now corrugated foils leave corrugating assemblies 30 and 32, pass tubular guides 42 and 44 to take-up reel 46 which winds the foils into a flat pancake coil about an axle 48. A conventional servo drive maintains a selected tension on the foils as the coil is wound. Take-up real 46 may be driven by a DC motor (not shown) with torque control). Take-up reel 46 is mounted on a slide base 50 which allows the reel to be moved into and out of alignment with guides 42 and 44. Axle 48 has a slot 49 therethrough as seen in detail section in FIG. 5. One side of reel 46 is removed and the ends of corrugated foils 26 and 28 are inserted thereinto to start a coil. A setscrew 51 is tightended to bear against the foil ends and hold them in place. The reel side is replaced and coiling begins.

A potentiometer servo drive controller and proximity switch assembly 52 is positioned adjacent to reel 46. Assembly 52 is pivotable at 54 to move it away from reel 46 when the reel is being replaced. When the coil reaches the desired diameter, as determined by the proximity switch, the coil is secured by adhesive tape and removed. Proximately switch assembly 52 may be any suitable device which can sense the growing coil on reel 46 and stop the coiling operation at the desired point. Switch assembly 52 may, for example, include an optical sensor using a light beam which, when interrupted by the growing coil, shuts off the winding drive in a conventional manner.

Figure 4:
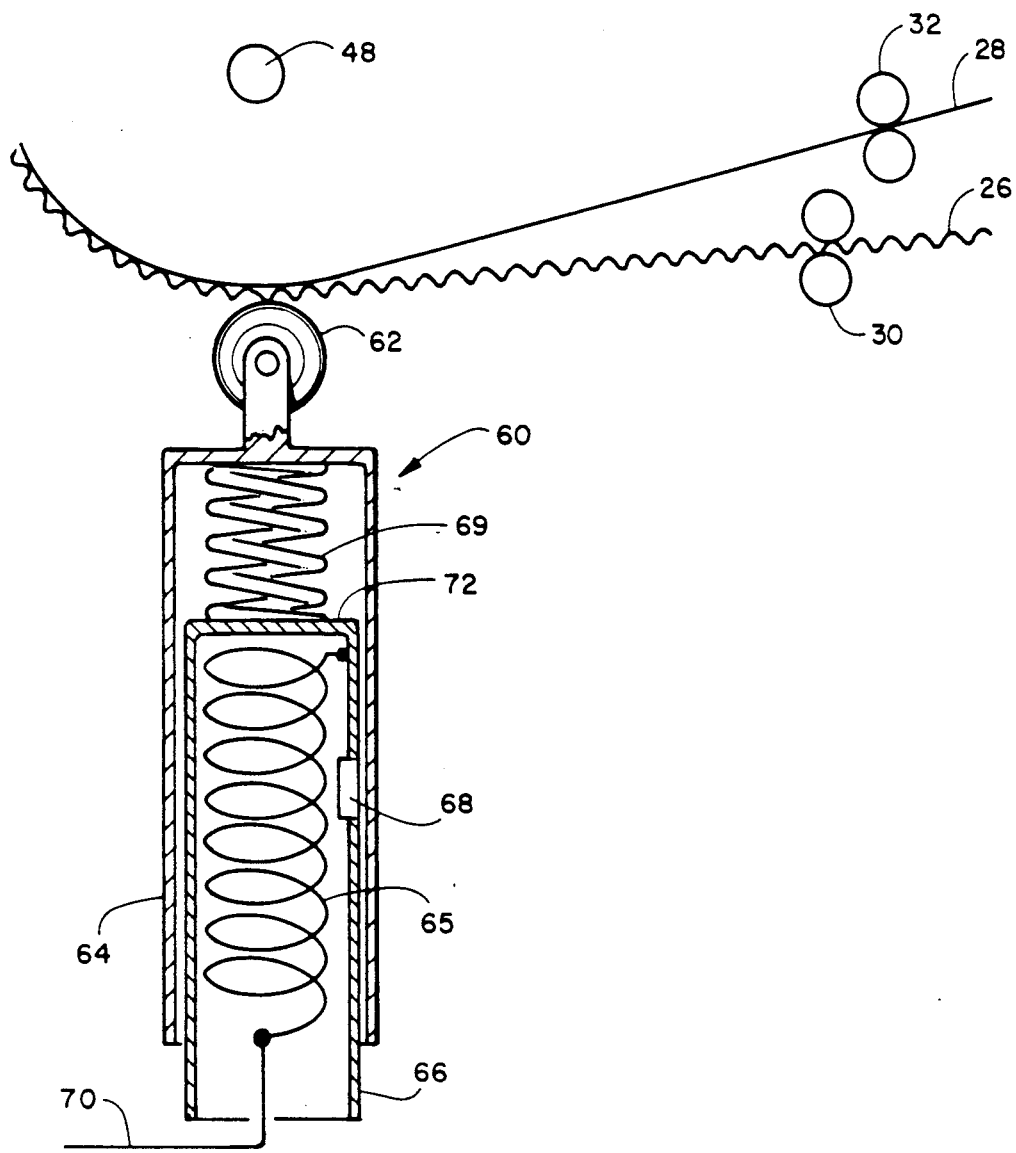
FIG. 4 is a schematic representation of a drive controller and limit switch assembly.

An electro-mechanical proximity switch, such as is schematically illustrated in FIG. 4, is particularly useful where a torque motor is used to drive take-up reel 46. In FIG. 4, only a portion of the apparatus of FIG. 3 is shown, starting where the foils 26 and 28 enter gear sets 30 and 32, respectively. In the embodiment shown, gear set 30 corrugates foil 26, while set 32 is a pair of closely spaced rollers to feed an uncorrugated foil 28 to the coiling mechanism. Axle 48 is rotated by the motor drive (not shown). Reel 46 is also not shown, for clarity.

A potentiometer or powerstat assembly 60 is selectively positioned near the coil, with a roller 62 on housing 64 positioned adjacent to the coil at a distance corresponding to the desired final coil diameter. Roller 62 and housing 64 are spring 69 biased away from a base 66 which is telescoped within housing 64. Resistive element 65 is formed from a suitable resistance wire, such as nickle-chromium. A slider 68 contacts element 65. A voltage input line 70 directs current through element 65, slider 68, then to the torgue motor (not shown) driving axle 48. As the coil increase in diameter, the current supplied to the torque motor is reduced, maintaining a constant torque as the coil increases in diameter.

This variance in torque is beneficial in compensating for foil material springback and stiffness. It takes greater load to deform the foils into the starting diameter, typically ⅛ inch diameter, than it does when the coil is larger. As the coil reaches the desired diameter, roller 62 and housing 64 move into the point where a limit switch schematically indicated at 72 is reached and tripped, stopping the coiling motor. This is a convenient, variable and efficient coiling control and limiting mechanism.

The coil is then secured by spot welding the end (or the other methods described above), the reel 46 is removed from support 50 and one side of the reel is removed to allow the coil to slip off of axle 48. The coil is then ready for installation in a corresponding opening in a honeycomb sheet.

While certain specific materials, configurations, parts and dimensions were described in the above description of preferred embodiments, those can be varied, where suitable, with similar results.

We claim:

1. A pancake insert for a honeycomb structure which comprises first and second elongated foil strips each having corrugations lying substantially perpendicular to the long dimension of said strips, the corrugations having different periods in the two strips, said strips would together around an axis substantially parallel to said corrugations, and means securing the outer end of said strips to said coil and
   an uncorrugated strip wrapped around said insert in an overlapping relationship with the overlapping ends bonded together.

2. The insert according to claim 1 wherein said strips have thicknesses of from about 0.001 to 0.008 inch.

3. The insert according to claim 1 wherein at least one strip has on at least one surface a thin layer of brazing material.

4. The insert according to claim 3 wherein said layer of brazing material is selected from the group consisting of copper, nickel and mixtures and combinations thereof.

5. The insert according to claim 1 wherein the thickness of said uncorrugated strip is greater than that of the corrugated strips.

6. In high strength, light weight panels which comprise a honeycomb core, two face sheets bonded to the core faces and a cut-out portion of said core and a reinforcing insert filling said cut-out and bonded to said face sheets, the improvement comprising:
   said insert comprises a first and second elongated foil strips each having corrugations lying substantially perpendicular to the long dimension of said strips, the corrugations having different periods in any adjacent strips, said strips wound together around an axis substantially parallel to said corrugations, means securing the outer end of said strips to said coil and an overlapping ring of uncorrugated material is wrapped around said coil and secured thereto.

7. The improvement according to claim 6 wherein said strips have thicknesses of from about 0.001 to 0.008 inch.

8. The improvement according to claim 6 wherein at least one strip has on at least one surface a thin layer of brazing material.

9. The improvement according to claim 6 wherein the thickness of said ring of uncorrugated material is greater than that of the corrugated strips.

* * * * *